Nov. 11, 1958      D. P. BRESEE      2,859,873

EQUIPMENT FOR MANUFACTURING MIXED FERTILIZERS

Filed Jan. 2, 1958      3 Sheets-Sheet 1

INVENTOR.
D. P. BRESEE

BY Hudson & Young

ATTORNEYS

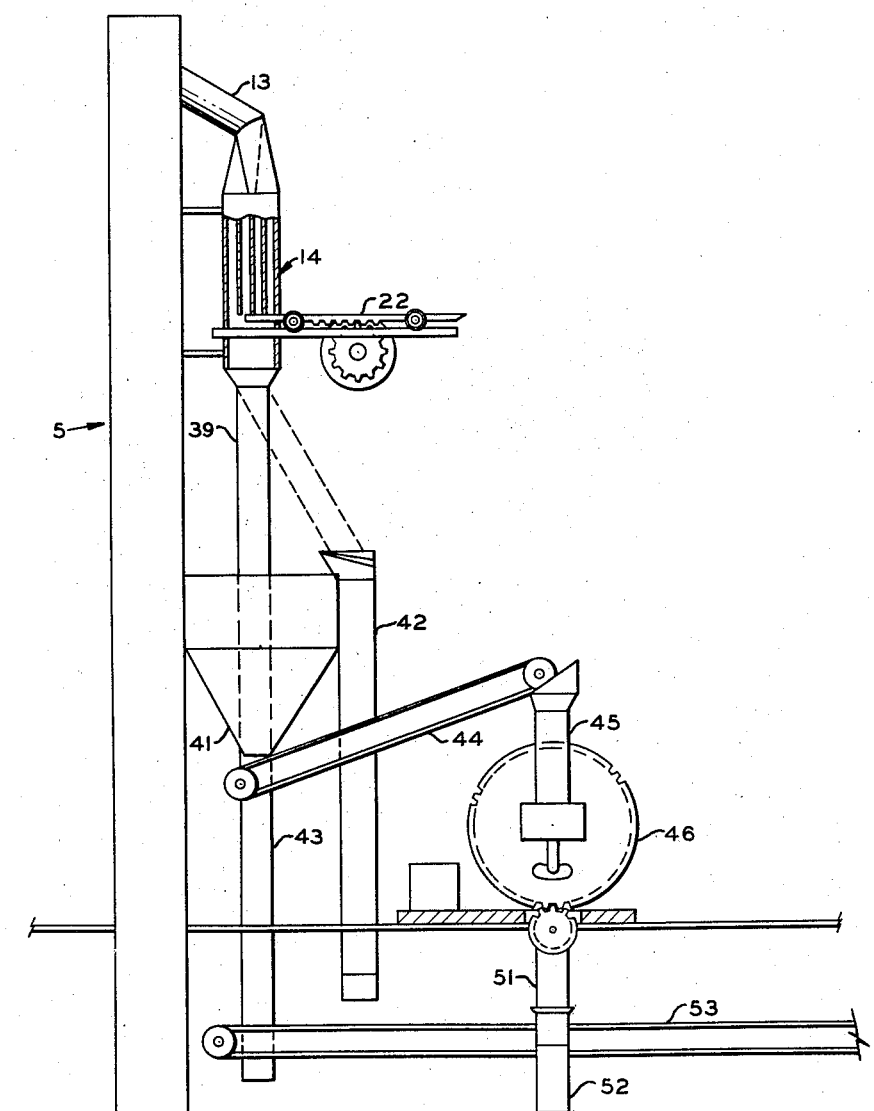
FIG. 2
INVENTOR.
D.P. BRESEE
BY 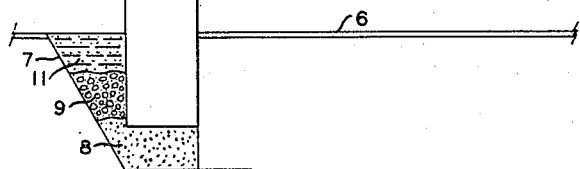
ATTORNEYS

Nov. 11, 1958 D. P. BRESEE 2,859,873
EQUIPMENT FOR MANUFACTURING MIXED FERTILIZERS
Filed Jan. 2, 1958 3 Sheets-Sheet 3

INVENTOR.
D. P. BRESEE
BY Hudson & Young
ATTORNEYS

United States Patent Office 2,859,873
Patented Nov. 11, 1958

2,859,873
EQUIPMENT FOR MANUFACTURING MIXED FERTILIZERS

Dick P. Bresee, St. Louis, Mo., assignor to Phillips Petroleum Company, a corporation of Delaware Application January 2, 1958, Serial No. 706,867

8 Claims. (Cl. 209—259)

This invention relates to equipment for manufacturing mixed fertilizers. In one aspect it relates to novel means to elevate, classify, mix and discharge mixed fertilizers. In a further aspect it relates to a novel combination classifier-mixer hopper.

With increasing demands for mixed fertilizer materials there has arisen a need for equipment which will require less manual labor necessary to mix, classify and convey fertilizer materials. While some of the equipment proposed, patented, or employed in the general trend of mechanization is suitable from various standpoints, much of this equipment lacks features which would insure complete mixing of bulk fertilizer materials, while other equipment is prohibitively costly to build and operate.

Accordingly, an object of this invention is to provide novel equipment for manufacturing mixed fertilizers. Another object is to elevate, classify, mix and discharge fertilizer materials in such a manner as to insure complete mixing of desirable fertilizer materials. Another object is to provide a novel combination classifier-mixer hopper which will insure adequate mixing of batch fertilizer materials. Another object is to discharge mixed fertilizer materials to a plurality of points of utility from a fertilizer plant. Another object is to mix fertilizer materials without the necessity of employing moisture or other liquid, thereby obviating the need for granulators, driers and cooling equipment. Further objects and advantages of this invention will become apparent from the following discussion, appended claims and drawing in which:

Figure 2 is a side elevational view of Figure 1; and

Figure 1:
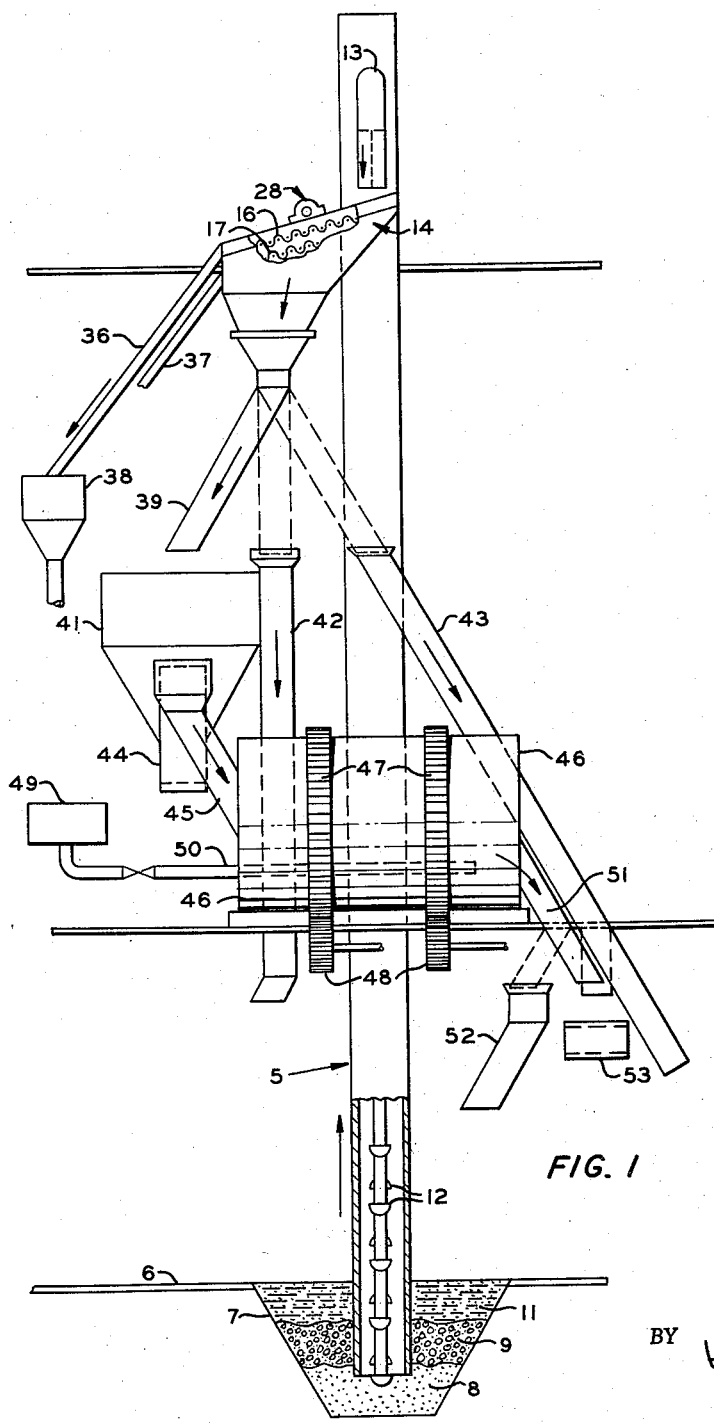
Figure 1 is a front elevational view of the fertilizer equipment of this invention.

Referring to the drawing now, in which like parts have been designated with like reference numerals, a fuller discussion of this invention will be detailed. A vertically mounted elevator generally designated 5 has a lower end or boot which extends beneath ground surface 6 and depends within a pit 7 containing various fertilizer materials 8, 9 and 11. Elevator 5 has a plurality of buckets 12 mounted on a pulley and adapted to scoop up the fertilizer materials in pit 7 and elevate the same to the top of the elevator where the buckets discharge into a spout 13, the latter preferably being bifurcated. Positioned below spout 13 is a combination classifier-mixer hopper generally designated 14. Mounted in an inclined manner across the top of hopper 14 are one or more removable classifying screens 16, 17. Discharge spout 13 and classifying screens 16, 17 are so positioned that the spout discharges the fertilizer materials across the width of the upper end or higher point of the screen 16. The screens 16, 17 can have any desired mesh, for example, screen 16 can have a size of about 4–6 standard mesh and screen 17 can have a size of about 14–20 standard mesh. A plurality of partitions 18, 19, 21 are mounted in the hopper 14 beneath the classifying screens 16, 17. These partitions are vertically spaced and oriented in a direction which is parallel to the direction of flow of the fertilizer discharge on top of the classifying screens 16, 17. These partitions define a plurality of compartments, the lower ends of which are closed by means of a gate 22 slidably mounted in the lower end of hopper 14 immediately beneath the partitions. Gate 22 is provided on its lower side with a rack 23 and wheels 24. Gate 22 is adapted to move horizontally to sequentially open and close the bottoms of the compartments defined by the partitions 18, 19, 21. Suitable support members 26 serve as rails for wheels 24 and are mounted on the lower end of the hopper 14. A suitable gear 27, which is driven by a suitable power source such as an electrical motor 25, is adapted to mesh with the rack 23 of the gate 22 and cause its horizontal movement in and out of the hopper 14. Mounted on the upper end of hopper 14 is suitable vibration equipment generally designated 28 comprising bearings 29 which receive a rotatable unbalanced shaft 31 which is driven by suitable power source such as a drive pulley 32, belt 33 and motor 34. Any other suitable vibration equipment can be substituted for that shown, such as pneumatic or hydraulic vibrators, or solenoid-type electric vibrators. Secured to the upper end of hopper 14 are one or more discharge chutes 36, 37 adapted to receive the on-screen materials from the tops of screens 16, 17 respectively. Discharge spout 36 can convey its on-screen material to a hammer mill 38 or the like which grinds or pulverizes the on-screen material, the resulting ground material being conveyed to either pit 7 or any point along elevator 5. The discharge chute 37 can lead to suitable bagging equipment.

Connected to the lower end of hopper 14 beneath gate 22 is a swivel spout or chute 39 adapted to move or swing about a vertical axis to define a conical path, the end of the chute discharging to a plurality of points of utility as shown in the drawing. Swivel spout 39 can discharge mixed fertilizer from hopper 14 to a surge hopper 41, or to a vertical discharge 42, or to an inclined discharge chute 43. When it is desired to ammoniate the mixed fertilizer material discharging from hopper 14, the swivel spout 39 is moved to the position indicated above surge hopper 41, from which the mixed fertilizer material discharges, onto a conveyor belt 44 and into the receiving spout 45 of a rotatable drum or granulator 46, the latter being provided on its outer cylindrical surface with one or more spur gears 47 which mesh with gears 48 driven by a suitable power source. A suitable ammoniated solution contained in vessel 49 can be conveyed via line 50 to the inside of granulator 46 where the ammoniating solution is sprayed onto the mixed fertilizer materials being tumbled within the rotatable granulator. The ammoniated fertilizer is discharged from granulator 46 by means of a discharge spout 51. The latter can be provided with a suitable two-way valve to convey the granulator discharge to either a spout 52 onto a pile on ground floor 6 or into a waiting truck, or onto a belt conveyor 53.

The swivel spout 39 can also be moved to a position to discharge the mixed fertilizer discharged from hopper 14 to chute 42, from which the fertilizer material can be deposited in a pile on the ground floor 6 or into a waiting truck. Alternatively, the swivel spout can be swung over to communicate with inclined chute 43, the lower end of which can be provided with a suitable two-way valve so as to discharge the mixed fertilizer product from the end thereof to a pile or waiting truck, or onto a conveyor belt 53.

In operation, solid raw materials, such as ammonium nitrate, ammonium sulfate, triple superphosphate, potash, and the like are batched into pit 7. These fertilizer materials can be dumped in pit 7 in a plurality of layers 8, 9 and 11. From pit 7 the fertilizer materials are elevated in elevator 5 by means of buckets 12 which scoop up the materials and elevate them to the top of the elevator. Initially the scoops 12 will elevate the fertilizer material mainly at the bottom of the pit. Where this material is relatively coarse or of poor quality, it will be elevated in the first part of the mixing cycle in such a manner that substantial portions thereof will be discharged from spout 13 and be retained on the top of screen 16. The on-screen material can be conveyed via chute 36 to the hammer mill 38, the resulting ground material being recycled to the pit 7 or to any point along the elevator 5. The material falling through the upper screen 16 and retained on the lower screen 17 can be conveyed via chute 37 to suitable bagging equipment. In order to maintain the required balance of fertilizer components, the material remaining on the screen 17 can only be sent to bagging equipment when it is substantially the same composition as that material which passes through the lower screen 17.

Figure 3:
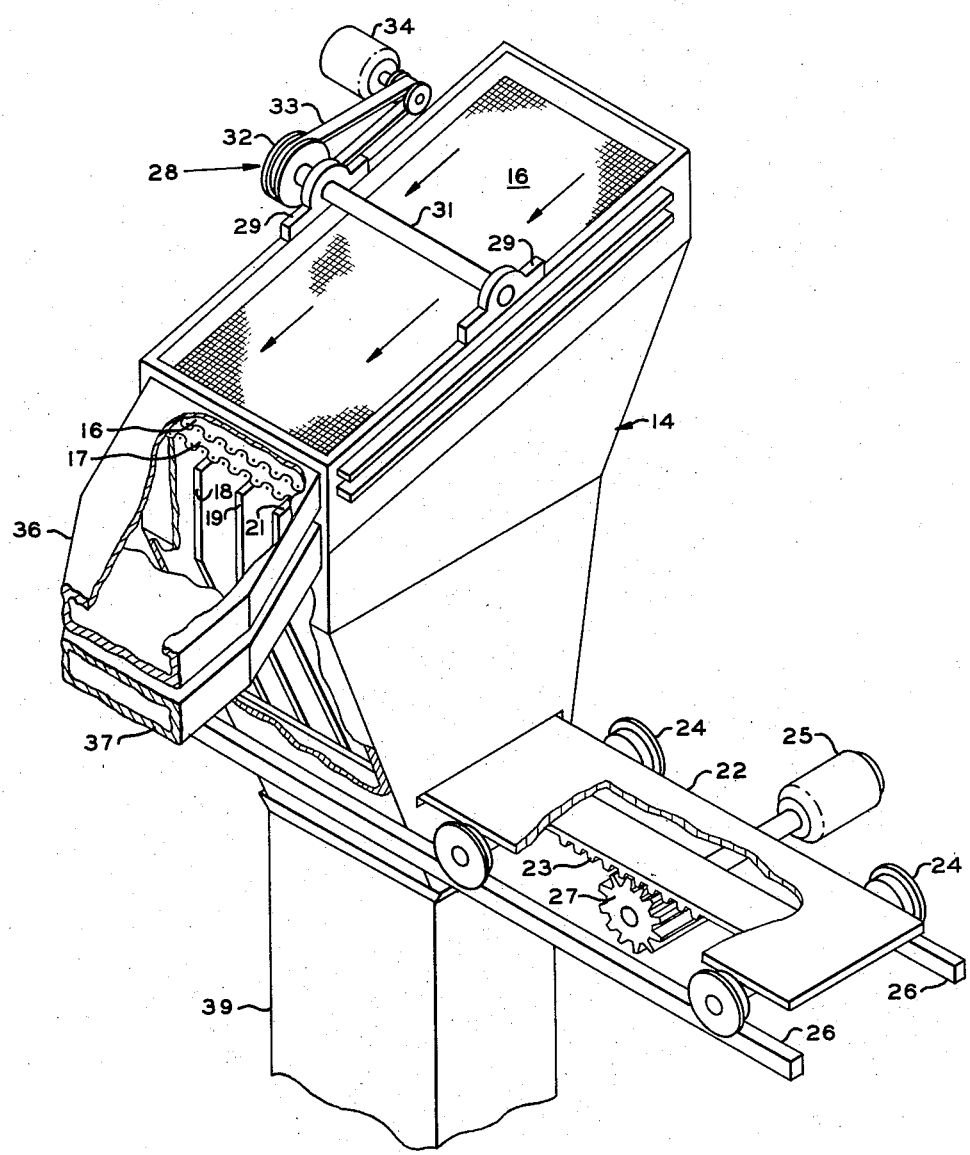
Figure 3 is an isometric view in partial section of the combination classifier-mixer hopper illustrated in Figures 1 and 2.

As the fertilizer materials are continuously elevated in elevator 5, the different materials in pit 7 will become mixed to some extent both in the pit 7 and in the elevator 5. The material which is discharged from spout 13 is dumped onto the upper end of the screens and cascades or flows in an inclined direction as indicated in Figure 3. The material which passes through the screens falls into the compartments defined by partitions 18, 19 and 21. Further mixing of the classified product occurs in the hopper 14. After the materials in the hopper have accumulated to a desirable extent, e. g., one ton, gate 22 is caused to slidably move outward thereby sequentially opening the bottom of each of the compartments. The material in the compartments will slough off in increments at an angle rather than in horizontal planes due to the arrangement of the partitions. The material discharged from spout 13 into the hopper 14 is subjected to continuous vibration which aids further mixing of the materials. The opening of gate 22 permits the material in hopper 14 to be discharged into swivel spout 39 where further mixing of material occurs.

Where it is desirable to ammonate the mixed fertilizer product from the hopper 14, the swivel spout 39 is positioned in such a manner as to discharge into surge hopper 41 from which the fertilizer material is conveyed into the rotating granulator 46. A suitable ammoniating or nitrogen solution comprises 66.8 percent ammonium nitrate, 16.6 percent ammonia, and 16.6 percent water. The fertilizer material is tumbled within granulator 46 and sufficient ammoniating solution is sprayed onto the tumbling fertilizer material. The ammoniated product is discharged from granulator 46 either into discharge spout 52 or onto a conveyor belt 53, the material so discharged being in final form.

Alternatively, the mixed fertilizer materials from hopper 14 can be conveyed by swivel spout 39 to either vertical chute 42 or inclined chute 43 to a plurality of points of utility.

Various modifications and alterations of this invention will become apparent to those skilled in the art from the foregoing discussion and drawing and it is to be understood that this invention is not limited thereto.

I claim:

1. Apparatus of the type described, comprising an elevator having a dsicharge spout at the upper end thereof, a combination classifier-mixer positioned below said spout, inclined screen classifying means mounted in the top of said hopper and adapted to receive the discharge from said spout across the higher end thereof, a plurality of partitions mounted in said hopper beneath said classifying means, said partitions being vertically spaced and oriented in a direction parallel to the flow of said discharge on said classifying means, said partitions defining a plurality of compartments in said hopper, gate means slidably mounted in the lower end of said hopper immediately beneath said partitions and adapted to sequentially open the bottoms of said compartments to permit the discharge thereof, means to vibrate said hopper and a discharge chute connected to said hopper beneath said gate means and adapted to receive said discharge from said compartments.

2. Apparatus of the type described, comprising a bucket elevator having a discharge spout at the upper end thereof, a combination classifier-mixer positioned below said spout, at least one inclined classifying screen mounted in the top of said hopper and adapted to receive the discharge from said spout across the higher end thereof, a plurality of partitions mounted in said hopper beneath said classifying screen, said partitions being vertically spaced and oriented in a direction parallel to the flow of said discharge on said classifying screen, said partitions defining a plurality of compartments in said hopper, gate means slidably mounted in the lower end of said hopper immediately beneath said partitions and adapted to sequentially open the bottoms of said compartments to permit the discharge thereof, means to vibrate said hopper and a discharge chute connected to said hopper beneath said gate means, said chute adapted to swing about a vertical axis and define a conical path with the upper end of said chute being the apex thereof, said chute adapted to receive the discharge from said hopper and convey the same to a plurality of points of utility.

3. Apparatus of the type described, comprising a bucket elevator having a discharge spout at the upper end thereof, a combination classifier-mixer positioned below said spout, at least one inclined classifying screen mounted in the top of said hopper and adapted to receive the discharge from said spout across the higher end thereof, a plurality of partitions mounted in said hopper beneath said classifying screen, said partitions being vertically spaced and oriented in a direction parallel to the flow of said discharge on said classifying screen, said partitions defining a plurality of compartments in said hopper, gate means slidably mounted in the lower end of said hopper immediately beneath said partitions and adapted to sequentially open the bottoms of said compartments to permit the discharge thereof, means to vibrate said hopper and a discharge chute connected to said hopper beneath said gate means, said chute adapted to swing about a vertical axis and define a conical path with the upper end of said chute being the apex thereof, a surge hopper, a rotatable granulating drum adapted to receive the discharge from said surge hopper, a vertical chute, and an inclined chute, any one of said surge hopper, vertical chute and inclined chute adapted to receive the discharge from said chute connected to said combination hopper.

4. The apparatus according to claim 3 wherein said gate means is adapted to move in and out of said combination hopper, and wherein said apparatus further comprises a rack secured to the bottom of said gate means, a plurality of wheels mounted on the lower side of said gate means, a pair of rails mounted on said combination hopper and adapted to permit siad wheels to ride thereon, a drive gear adapted to mesh with said rack, and power means adapted to rotate said drive gear, thereby causing said gate means to move in and out of said hopper.

5. Apparatus of the type described, comprising a bucket elevator having a boot depending within a pit in the ground level and a bifurcated discharge spout connected to the top of said elevator, a combination classifier-mixer positioned below said spout, at least two vertically spaced inclined classifying screens mounted in the top of said hopper and adapted to receive the discharge from said spout across the higher end of said screens, chutes connected to said hopper and adapted to receive material which is retained by said screens, a plurality of partitions mounted in said hopper beneath said screens, said partitions being vertically spaced and oriented in a direction parallel to the flow of said discharge on the top of said screens, said partitions defining a plurality of compartments in said hopper, a horizontal slidably movable gate mounted on the lower end of said hopper immediately beneath said partitions and adapted to sequentially open the bottoms of said compartments to permit the discharge thereof, a rack secured to the underside of said gate, a plurality of wheels mounted on the underside of said gate, a pair of rails mounted on said hopper and adapted to permit said wheels to ride thereon, a drive gear adapted to mesh with said rack, power means adapted to rotate said drive gear to cause said gate to move in and out of said hopper, means to vibrate said hopper including said screens, a swivel discharge chute connected to the lower end of said hopper beneath said gate and adapted to receive the discharge from said hopper, said swivel discharge chute adapted to swing about a vertical axis and define a conical path with the upper end of said swivel chute being the apex thereof, a surge hopper, a rotatable granulating drum adapted to receive the discharge from said surge hopper, a vertical chute, and an inclined chute, any one of said surge hopper, vertical chute, and inclined chute adapted to receive the discharge from said swivel chute.

6. A combination classifier-mixer hopper, comprising inclined screen classifying means mounted in the top of said hopper and adapted to receive and classify material discharge across the top of the upper end thereof, a plurality of partitions mounted in said hopper beneath said classifying means, said partitions being vertically spaced and oriented in a direction parallel to the flow of said discharge on said classifying means, said partitions defining a plurality of compartments in said hopper, gate means slidably mounted in the lower end of said hopper immediately beneath said partitions and adapted to sequentially open the bottoms of said compartments to permit the discharge thereof, means to vibrate said hopper and a discharge chute connected to said hopper beneath said gate means.

7. A combination classifier-mixer hopper according to claim 6 wherein said gate means is adapted to move in and out of said combination hopper, and wherein said apparatus further comprises a rack secured to the bottom of said gate means, a plurality of wheels mounted on the lower side of said gate means, a pair of rails mounted on said combination hopper and adapted to permit said wheels to ride thereon, a drive gear adapted to mesh with said rack, and power means adapted to rotate said drive gear, thereby causing said gate means to move in and out of said hopper.

8. A combination classifier-mixer hopper according to claim 6 wherein said chute is adapted to swing about a vertical axis and define a conical path with the upper end of said chute being the apex thereof.

References Cited in the file of this patent

UNITED STATES PATENTS

| | | |
|---|---|---|
| 922,863 | Dor-Delattre | May 25, 1909 |
| 1,116,182 | Wedge | Nov. 3, 1914 |
| 1,328,486 | Bevin et al. | Jan. 20, 1920 |
| 1,720,112 | Allen | July 9, 1929 |
| 2,071,456 | Dartnell | Feb. 23, 1937 |
| 2,385,494 | Boynton | Sept. 25, 1945 |
| 2,593,425 | Evans | Apr. 22, 1952 |